June 1, 1943.  L. J. BELANGER  2,320,344
AUXILIARY SEAT STRUCTURE
Filed Aug. 15, 1940
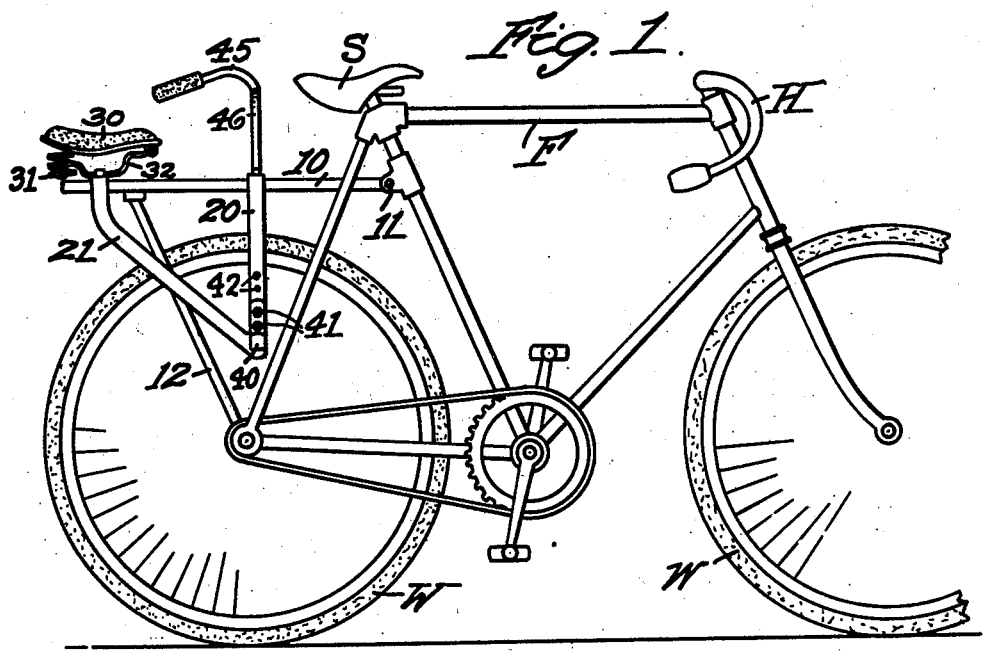
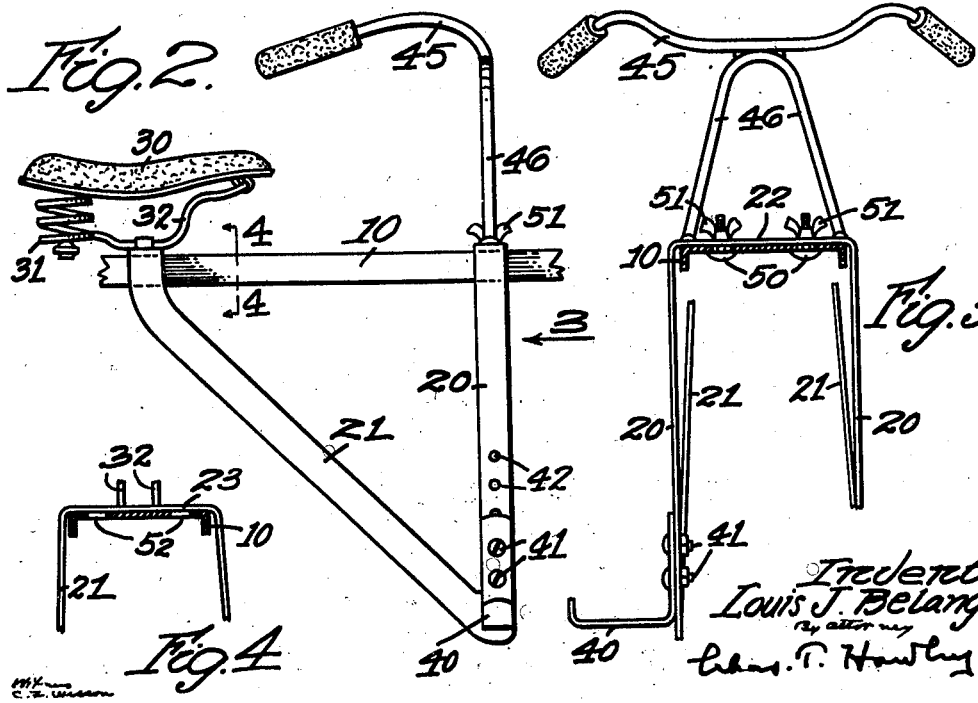

Patented June 1, 1943

2,320,344

UNITED STATES PATENT OFFICE 2,320,344

AUXILIARY SEAT STRUCTURE

Louis J. Belanger, Graniteville, Vt.

Application August 15, 1940, Serial No. 352,806

3 Claims. (Cl. 155—5.12)

This invention relates to bicycles and particularly to the convenient and safe transportation of a child or other small person thereon. It is a common practice to carry such extra passengers on handle-bars or on a front frame member but accidents frequently occur, either by falls or by catching some part of the person or clothing in the machine.

It is the general object of my invention to provide an improved auxiliary seat structure for such purposes, arranged behind the rider and in such position that safety is assured.

Another object of the invention is to provide an auxiliary seat structure which can be quickly and easily attached to the usual rear luggage carrier of a bicycle, and which can be as easily removed when not needed.

My improved auxiliary seat structure is economical to manufacture, simple in application and entirely satisfactory and reliable in use.

My invention further relates to arrangements and combinations of parts which will be hereinafter described and more particularly pointed out in the appended claims.

A preferred form of the invention is shown in the drawing, in which

Fig. 1 is a side elevation of a bicycle having my auxiliary seat structure mounted thereon;

Fig. 2 is an enlarged side elevation of the auxiliary seat structure;

Fig. 3 is a partial front view, looking in the direction of the arrow 3 in Fig. 2; and Fig. 4 is a partial sectional elevation, taken along the line 4—4 in Fig. 2.

Referring to Fig. 1, I have shown parts of a conventional bicycle having a frame F, wheels W, saddle S, and handle-bars H, all of the usual construction.

I have also shown a luggage carrier 10 having its front end secured at 11 to the frame F and having brace rods 12 extending down to the axle of the rear wheel. The luggage carrier 10 shown is also of a common construction and is usually provided with longitudinal slots to facilitate the attachment of a wire package holder or other desired article thereto.

My improved auxiliary seat structure comprises a rigid frame having front legs 20, rear legs 21, a front cross member 22, and a rear cross member 23. The legs 20 and 21 are welded or otherwise secured together at their lower ends to form the V-shaped open side members of the auxiliary seat structure, and each pair of legs 20 or 21, with its associated cross member 22 or 23, forms an inverted U-shaped assembly, as shown in Fig. 3.

An auxiliary saddle 30 of any usual type is provided with springs 31 and supporting rods 32 and is firmly secured to the rear cross member 23. Foot supports 40 are secured by bolts 41 to the lower portions of the front legs 20 and may be adjusted in height by inserting the bolts 41 through selected holes 42 in the legs 20. Handle-bars 45 are fixed to a support 46, which in turn is rigidly secured to the front cross member 22.

The entire structure shown in detail in Figs. 2, 3 and 4 thus forms a unit which is complete in itself and which may be readily attached to the support 10 by bolts 50 and wing-nuts 51. The bolts 50 pass through the front cross member 22 and through openings in the carrier 10 and constitute the only necessary attachment of the auxiliary seat to the bicycle.

Furthermore, as the bolts 50 are commonly inserted through longitudinal slots 52 in the carrier 10, the entire seat structure may be adjusted forward or rearward, merely by loosening the nuts 51.

It will thus be seen that I have provided an exceedingly simple auxiliary seat structure, which is strongly and rigidly built, which has no separable parts, and which may be applied and removed as a convenient unit from the bicycle on which it is used. By adjusting the footrests 40 up or down, the seat may be easily adapted to children of different ages and sizes.

Having thus described my invention and the advantages thereof, I do not wish to be limited to the details herein disclosed, otherwise than as set forth in the claims, but what I claim is:

1. In a bicycle, in combination, a rearwardly elongated and substantially flat platform member of substantial width, means to rigidly secure said platform member to said bicycle in a fixed position over the rear wheel thereof, front and rear auxiliary frame members each having a flat middle portion directly engaging and supported on and by said platform member, means to rigidly secure one of said middle portions to said platform member and with said flat middle portions in forwardly and rearwardly spaced relation, said front and rear auxiliary frame members having downwardly converging side portions secured together in pairs at their lower ends and at each side of said bicycle, an auxiliary seat, and means to secure said auxiliary seat to the flat middle portion of said rear auxiliary frame member and above said platform member.

2. In a bicycle having a rear luggage carrier with a laterally extended flat upper surface, that improvement which comprises a rigid open frame structure which has V-shaped open frame members at each side and rigid forwardly-and-rearwardly-spaced cross members connecting the top parts of said side frame members to form inverted U-shaped frame portions, said cross members being substantially flat and resting on and directly engaging said flat luggage carrier and constituting the entire support for said rigid frame structure, means to secure one of said flat cross members to the top of said carrier, a saddle mounted at the rear part of said rigid frame structure, and foot supports rigidly mounted on depending portions of said side frame members.

3. In a bicycle having a rear luggage carrier with a laterally extended flat upper surface, that improvement which comprises a rigid open frame structure having V-shaped side frame members and forwardly-and-rearwardly-spaced rigid front and rear cross members connecting the tops of the two front legs of said side frame members anld the tops of the two rear legs of said side frame members respectively, said cross members being substantially straight and resting on and directly engaging said luggage carrier and constituting the entire support for said rigid frame structure, means to secure one of said cross members to said carrier, a saddle mounted on the rear cross member, handle-bars projecting upward from a front portion of said rigid frame structure and rigidly secured thereto, and foot supports mounted on depending portions of said side frame members.

LOUIS J. BELANGER.